United States Patent [19]
Janzen et al.

[11] Patent Number: 5,134,714
[45] Date of Patent: Jul. 28, 1992

[54] REMOTE CONTROL OF PRIORITY COMMUNICATIONS AUTOMATIC

[75] Inventors: James D. Janzen, Hanover Park; Jeffrey Lohrbach, Elgin, both of Ill.; Michael S. Densmoor, Jakarta Selatan, Indonesia; Gregory A. Dertz, Lake In The Hills; Scott M. Mottonen, Streamwood, both of Ill.

[73] Assignee: Motorola; Inc., Schaumburg, Ill.

[21] Appl. No.: 596,257

[22] Filed: Oct. 12, 1990

[51] Int. Cl.⁵ .......................... H04B 7/26; H04Q 7/00
[52] U.S. Cl. .................................. 455/54.2; 370/95.1; 379/63; 455/58.1
[58] Field of Search .................. 455/33, 34, 53, 54, 455/56, 62, 67, 166; 379/59, 60, 63; 340/825.5, 825.51; 370/85.6, 95.1, 95.2, 95.3

[56] References Cited

U.S. PATENT DOCUMENTS

| | | | |
|---|---|---|---|
| 4,573,207 | 2/1986 | Smith et al. | 455/54 |
| 4,672,601 | 6/1987 | Ablay | 370/31 |
| 4,692,965 | 9/1987 | Zdunek | 455/17 |
| 4,716,407 | 12/1987 | Borras et al. | 340/825.04 |
| 4,839,892 | 6/1989 | Sasaki | 370/95.1 |
| 4,905,302 | 2/1990 | Childress et al. | 455/34 |
| 4,977,589 | 12/1990 | Johnson et al. | 379/58 |

Primary Examiner—Reinhard J. Eisenzopf
Assistant Examiner—Chi H. Pham
Attorney, Agent, or Firm—Darleen J. Stockley

[57] ABSTRACT

A communication resource method is set forth that allows communication with a subscriber unit that is in a priority access mode. Either a communication resource allocator or a subscriber unit is enabled to initiate a priority communication state in which a subscriber unit is accessible to reception of radio transmissions during the subscriber unit's priority mode status.

26 Claims, 7 Drawing Sheets

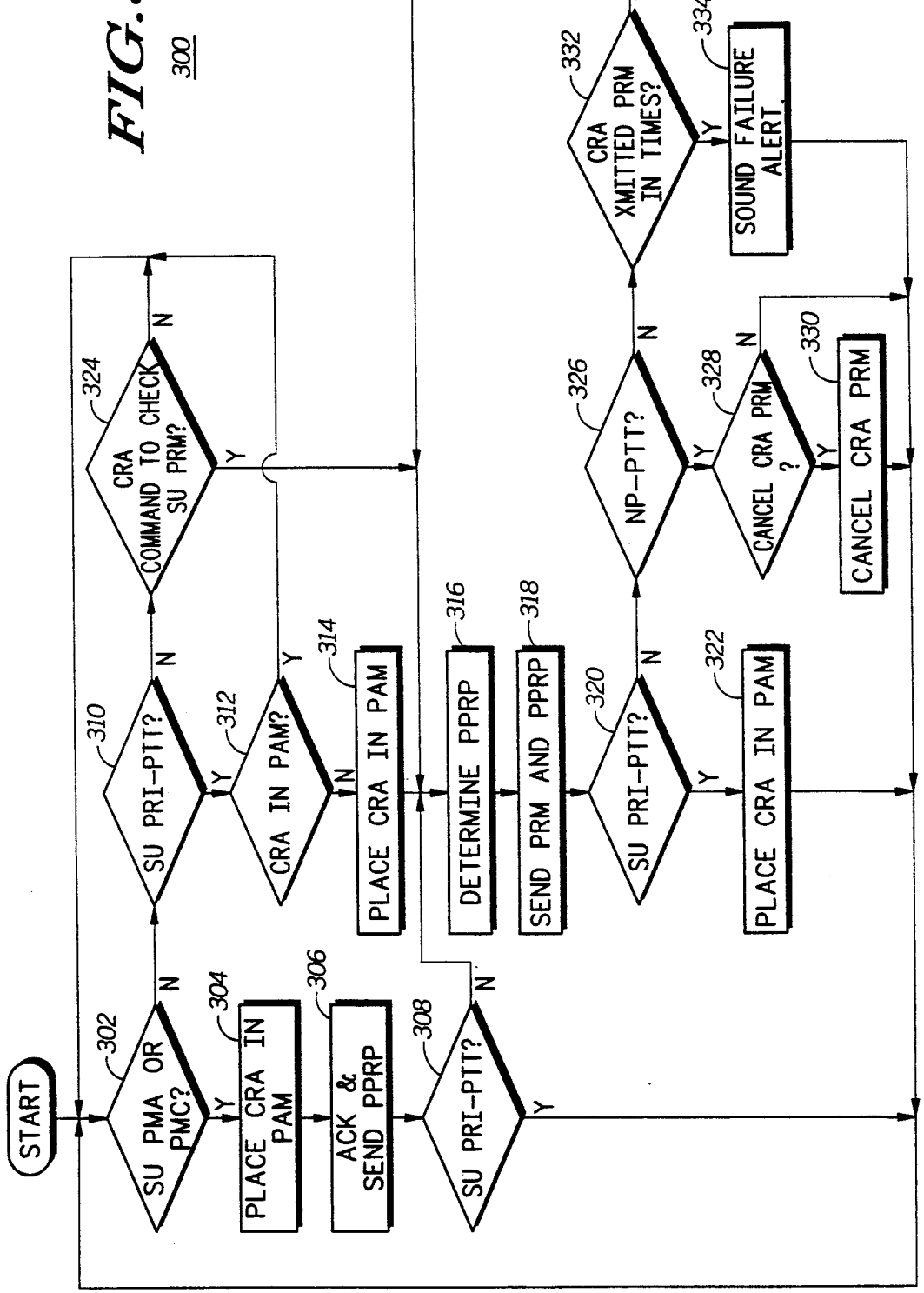

600

REMOTE CONTROL OF PRIORITY COMMUNICATIONS AUTOMATIC

TECHNICAL FIELD

The present invention relates generally to communication systems and, in particular, to such systems having at least one communication resource allocator for subscriber units where a subscriber unit is capable of sending non-voice information to the at least one communication resource allocator.

BACKGROUND OF THE INVENTION

In non-trunked radio frequency signaling systems, a limited number of communication resources are available. Typically, any one subscriber unit (SU) of a plurality of subscriber units may gain access to a radio frequency (RF) channel, thereby locking out all other subscribers on that particular channel for the time period that that given SU utilizes the selected channel. With all available radio-frequency channels in use, and, in particular, with a necessity for a priority communication, a communication resource allocator (CRA) may be unable to accommodate a crucial message when needed.

Therefore a need exists for a method that allows a SU to obtain assignment and utilization of a RF channel for concomitant transmission and reception periods, and that simultaneously allows a CRA to control a length of time that a SU may utilize a channel for transmitting and receiving signals.

SUMMARY OF THE INVENTION

This need and others are substantially met by the access enabling resource allocation method for a communication system of the present invention.

In particular, in a communication system with a limited number of communication resources, a plurality of SUs, and at least one CRA for allotting the limited number of communication resources among the plurality of SUs, this method provides for automatically processing priority transmissions. The method of this invention provides for:

allocation of a predetermined pair of related priority operational periods by at least one CRA to a SU upon one of: receipt by the CRA of a priority message access signal from the SU, receipt by the CRA of a priority message communication signal from the SU, and receipt by the SU of a priority remote monitor signal from the CRA, and utilization of the predetermined pair of related priority operational periods by the SU, the related priority operational periods being a selected pair of transmission and reception time periods available to SUs for priority communications.

BRIEF DESCRIPTION OF THE DRAWINGS

FIG. 3 is a flow diagram of an implementation of a method by a CRA in accordance with the invention.

BEST MODE FOR CARRYING OUT THE INVENTION

Figure 1:
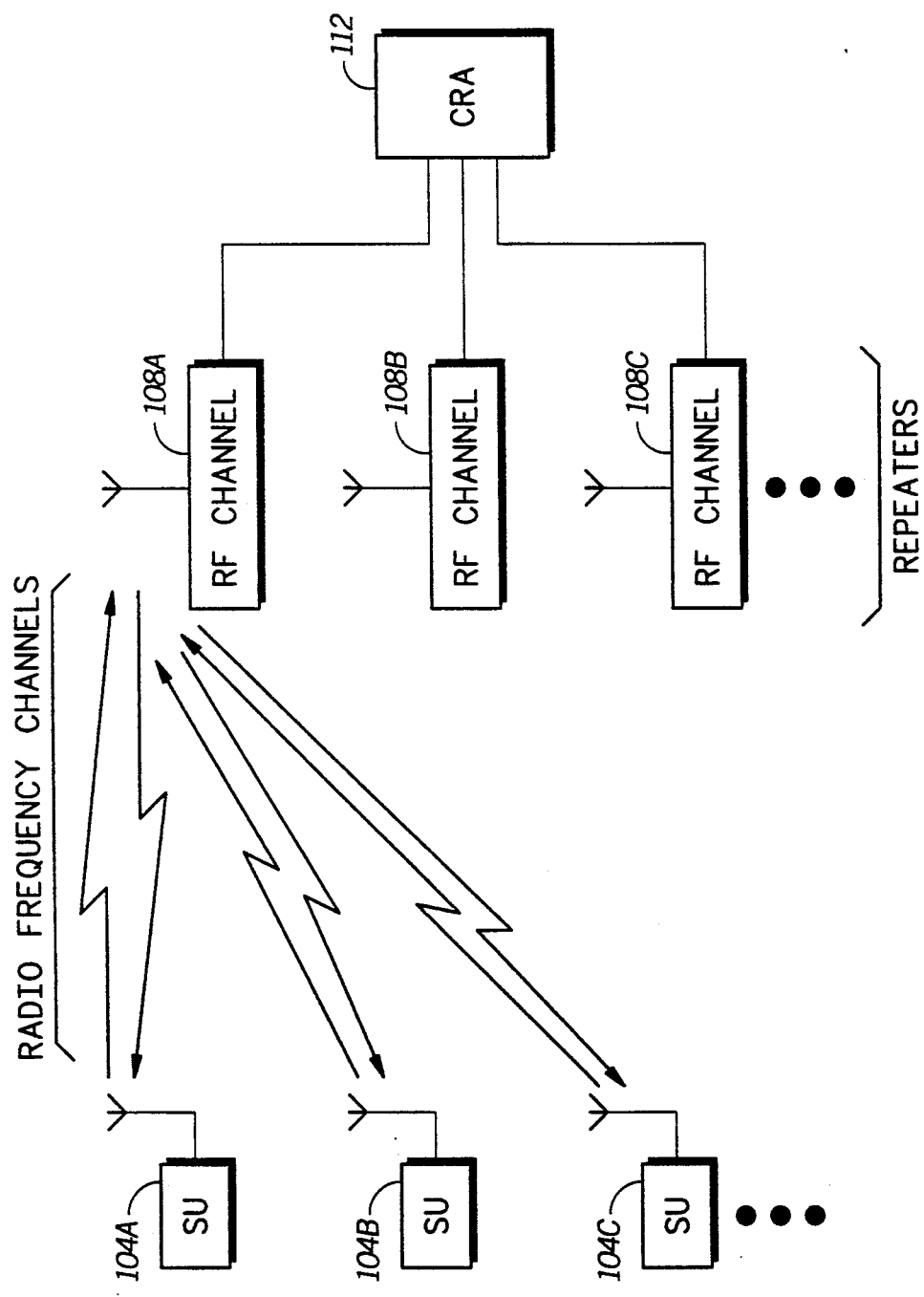
FIG. 1 is a block diagram of a communication system utilizing at least one communication resource allocator (CRA) with a plurality of subscriber units in accordance with the invention.

The operation of a communication system implementing the present invention is shown in FIG. 1, generally depicted by the numeral 100, setting forth at least one CRA (112) together with at least one SU (104A). The SUs (104A, 104B, 104C, ...) operate on at least one RF channel (108A, 108B, 108C, ...) monitored by at least one CRA (112). Although only three SUs (104A, 104B, 104C, ...) and three RF channels (106, 108A, 108B) are depicted, it will be obvious to one skilled in the art that numerous SUs and RF channels may be utilized.

Certain terms are defined as follows:

a priority access mode (PAM) is a condition indicating a need for immediate access to a radio channel;

a priority message access signal (PMA) is substantially a signal automatically transmitted by a SU to a CRA to initiate an automatic allocation of a predetermined pair of related priority operational periods to the SU;

a predetermined pair of related priority operational periods (PPRP) is substantially a selected pair of transmission and reception time periods available to SUs for priority communications;

a priority message communication signal (PMC) is substantially a manual signal from a SU to a CRA to indicate that a SU desires allocation of a priority transmission period;

a signal requesting a priority operational period is a PMA/PMC, being one of a PMA and a PMC;

a priority remote monitor signal (PRM) is substantially a signal from a CRA to a SU to automatically initiate an allocation of a predetermined pair of related priority operational periods to the SU;

an priority push-to-talk (PRI-PTT) is a keying of a SU transmitter while in the PAM to allow a priority transmission;

a non-priority push-to-talk (NP-PTT) is a keying of a SU transmitter while not in a PAM to allow a non-priority transmission;

a communication resource allocator (CRA) is a device allowing for at least some computer control of assignment and monitoring of communication channels and may typically consist of a radio control console, a computer aided dispatch (CAD) system and/or a trunking central controller as is known in the art;

a priority reset signal (PRS) is a signal substantially cancelling a priority access mode (PAM) and returning a device to a normal transmission mode; and user-activated is activation accomplished non-automatically by a user.

Figure 2A:
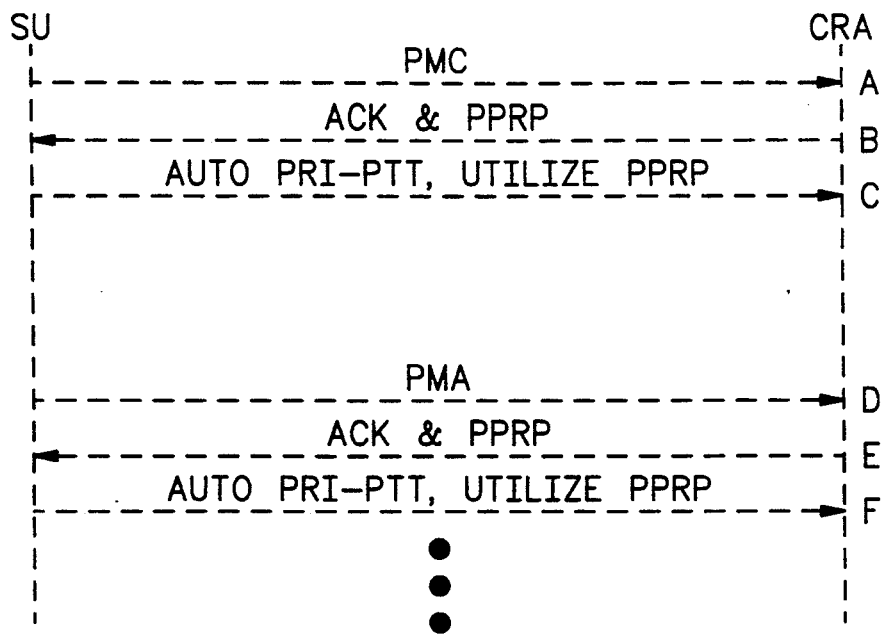
FIG. 2A is a timing diagram detailing an implementation of the method of the present invention by a subscriber unit (SU) wherein there are no transmission errors.
Figure 2B:
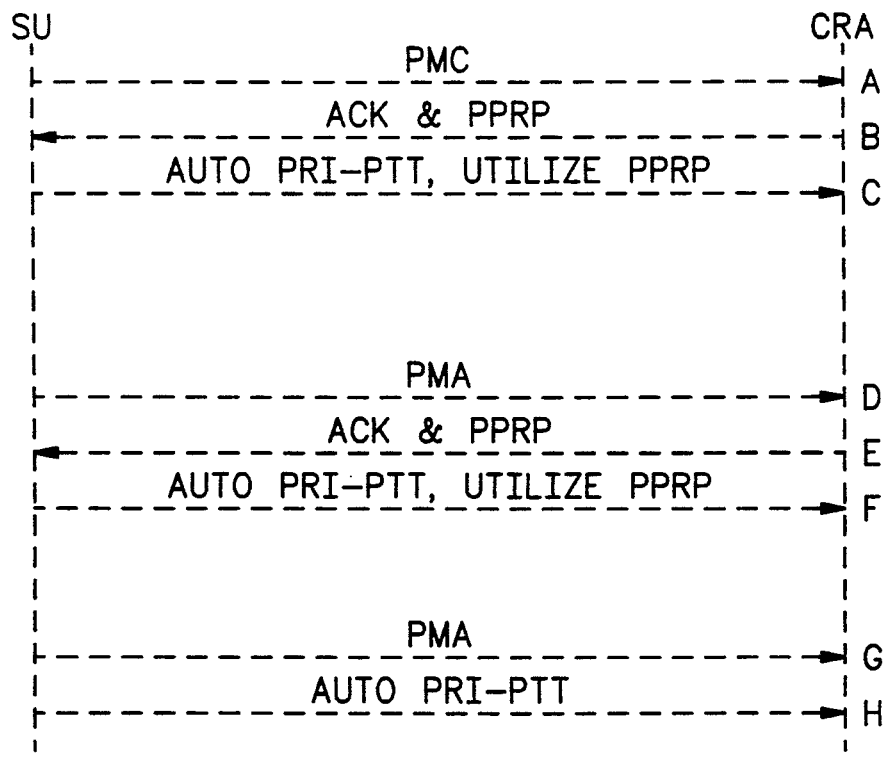
FIG. 2B is a timing diagram detailing an implementation of the method of the present invention wherein a communication resource allocator acknowledgement ceases to be received by a subscriber unit.

FIG. 2A, generally depicted by the numeral 200, sets forth a standard initiation of a priority access mode by a SU in accordance with the present invention. FIG. 2B, numeral 225, sets forth an implementation of the method of the present invention wherein a communication resource allocator acknowledgement ceases to be received by a subscriber unit. Initiation of a priority access mode by a SU is accomplished by the SU manually transmitting a PMC to a CRA, step A (FIG. 2A, 2B; A). Upon receipt of a PMC, the CRA transmits an acknowledgement (ACK) together with a PPRP to the SU, step B (FIG. 2A, 2B; B). When a PPRP is not received by the SU, the step of the SU automatically transmitting a PMC to a CRA (FIG. 2A, 2B; A) is repeated up to n times, n=20 being a typical number of times. Repetition is stopped upon occurrence of one of: the SU receiving the acknowledgement and PPRP; and the SU automatically transmitting a PMC to a CRA (FIG. 2A, 2B; A) n times and not receiving the acknowledgement and PPRP. Upon the SU automatically transmitting a PMC to a CRA n times and not receiving an acknowledgement, the SU receives no ACK (FIG. 2B; G), one more PRI-PTT is transmitted utilizing a SU preprogrammed time period, step H (FIG. 2B; H). Upon the SU receiving the acknowledgement and PPRP, the SU automatically keys a PRI-PTT signal to the CRA in accordance with a selected predetermined time period (PPRP) measured from the transmission of the PMA/PMC, and utilizes the PPRP allotted by the CRA, step C (FIG. 2A, 2B; C). A typical selected predetermined time period may range from five seconds to one minute depending on needs of a user and a system. Systems with large numbers of users typically utilize a time period of 5 to 20 seconds.

Steps A through C are repeated as steps D through F (FIG. 2A, 2B; D, E, F), utilizing a PMA in place of a PMC. When the SU receives no ACK from the CRA, step G (FIG. 2B; G), one more PRI-PTT is transmitted utilizing a SU preprogrammed time period, step H (FIG. 2B; H), and repetition stops. Although steps D through F are repeated only once in the FIG. 2A and FIG. 2B timing diagrams, it will be obvious to one skilled in the art that steps D through F are repeatable for any selected number of times and continue until cancellation of the PMA by one of: a PRS (FIG. 2D; H); a PRS and a PRS ACK (FIG. 2D; H, I) as set forth in FIG. 2D; and a local cancellation by a SU. A local cancellation by a SU is typically a positive cancel command by the SU.

Figure 2C:
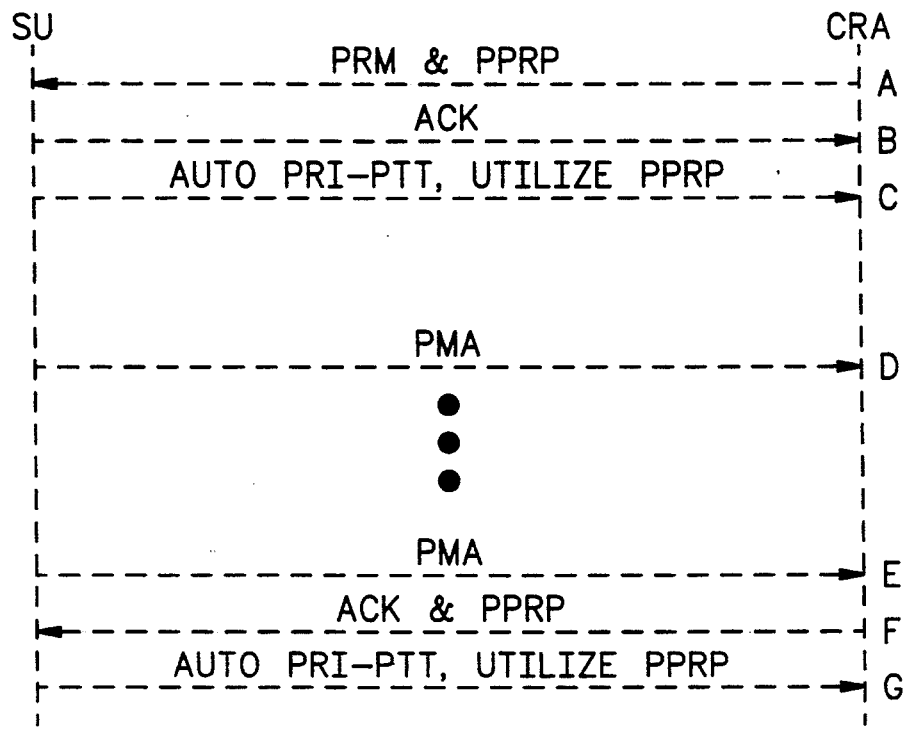
FIG. 2C is a timing diagram detailing an implementation of the method of the present invention by a communication resource allocator (CRA) when there are no transmission errors.

FIG. 2C, generally depicted by the numeral 250, shows a standard query for a SU priority access mode by a CRA. That query is accomplished by the CRA transmitting a PRM and an allotted PPRP to the SU requesting information on the SU's priority state, step A (FIG. 2C; A). Upon receiving the PRM from the CRA, the SU transmits to the CRA an acknowledgement, step B (FIG. 2C; B), and either a PRI-PTT when in a priority mode or a NP-PTT when not in a priority transmission state, and utilizes the allotted PPRP, step C (FIG. 2C; C). When in a priority mode, after utilizing the allotted PPRP, the SU transmits a PMA, step D, E (FIG. 2C; D, E), receives an ACK and PPRP from the CRA, step F (FIG. 2C; F) as in FIG. 2A, and transmits a PRI-PTT together with utilizing the PPRP, step G (FIG. 2C; G). Steps D, E, and F are repeated until cancellation of the PMA by one of: a PRS (FIG. 2D;H); a PRS and a PRS ACK (FIG. 2D; H, I) as shown in FIG. 2D, numeral 275; and a local cancellation by a SU.

Figure 2D:
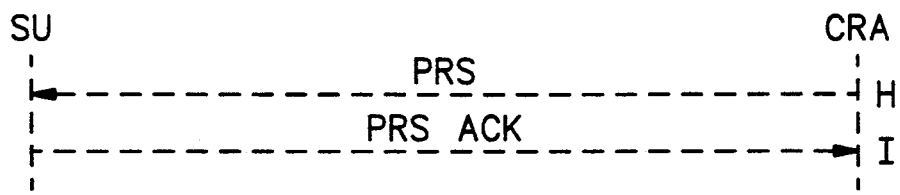
FIG. 2D is a timing diagram detailing an implementation of cancellation of a PMA/PMC.

FIG. 2D, sets forth a timing diagram showing cancellation of a PMA/PMC by a CRA. Upon desiring to cancel a SU's PAM, a CRA transmits a PRS (FIG. 2D; H). Upon receiving the PRS, the SU transmits a PRS ACK (FIG. 2D; I).

FIG. 3, generally depicted by the numeral 300, sets forth a flow diagram of an implementation of a method by a CRA in accordance with the invention, showing system procedures, including adjustments for transmission errors. To understand the adjustments for transmission errors, it is perhaps best to first describe a flow loop, referred to herein as loop 1, in which no transmission errors occur. A CRA determines whether it has received a priority access request, a PMA/PMC, from a SU (302). When a PMA/PMC has been received, the CRA registers the SU's PAM (304), acknowledges the SU PMA/PMC and transmits a PPRP to the SU (306). A PPRP is typically 10 to 20 seconds transmission time and 10 to 20 seconds reception time. The CRA then checks for reception of a second PRI-PTT from the SU, indicating that the SU has received the PPRP (308), and, where the CRA has received a SU second PRI-PTT, recycles to determining whether the SU is transmitting a PMA/PMC (302). Loop 1 is now closed.

When no PMA/PMC has been received by the CRA (302), the CRA determines whether a first PRI-PTT is being received (310);

upon not receiving a first PRI-PTT (310), the CRA determines whether to transmit a PRM command to the SU to check the PAM state of the SU (324);

when the CRA determines not to transmit a PRM (324), the CRA recycles to determining whether a PMA/PMC has been received from the SU (302); and when the CRA determines to transmit a PRM (324), the CRA cycles to determining a PPRP (316) and continues cycling as set forth below.

The flow diagram of FIG. 3 beginning with the CRA's receiving a first PRI-PTT from the SU is described as loop 2. Upon reception of a first PRI-PTT from the SU (310), the CRA determines whether the CRA console has registered the SU in a PAM (312). If not, the CRA registers the SU on the CRA console as being in a PAM (314), determines an authorized pair of predetermined transmission and reception time periods (PPRP) for the SU (316), and checks for reception of a third PRI-PTT from the SU (320). A PPRP is typically 10 to 20 seconds transmission time and 10 to 20 seconds reception time. Upon receiving a third PRI-PTT from the SU (320), the CRA registers the SU on the CRA console as being in a PAM if such registration has not already taken place (322), and recycles to determining whether a PMA/PMC has been received from the SU (302). Loop 2 is now closed.

In the loop 2 pathway, upon the CRA's determining that the SU is registered on the CRA console as in a PAM (312), the CRA recycles to determining whether a PMA/PMC has been received from the SU (302).

In the loop 2 pathway, upon the CRA's not receiving a third PRI-PTT from the SU (320), the CRA determines whether it is receiving a non-priority transmission (NP-PTT) from the SU (326). When the CRA is not receiving a NP-PTT from the SU (326), the CRA determines whether the PRM has been transmitted a predetermined number of times. N (332). A typical predetermined number of times, N, is five. When the PRM has not been transmitted a predetermined number of times (332), the CRA recycles to determining an authorized PPRP for the SU (316). When the PRM has been transmitted a predetermined number of times (332), the CRA sounds a failure alert at the CRA console (334), and recycles to determining whether a PMA/PMC has been received from the SU (302).

When the CRA is receiving a non-priority transmission from the SU (326), the CRA determines whether to cancel the PRM (328). When the CRA desires to cancel the PRM (328), the PRM is cancelled (330) and the CRA recycles to determining whether a PMA/PMC has been received from the SU (302). When the CRA does not desire to cancel the PRM (328), the CRA recycles to determining whether a PMA/PMC has been received from the SU (302).

In loop 1, when the CRA is not receiving a second PRI-PTT from the SU (308), the CRA cycles to determining an authorized pair of predetermined transmission and reception time periods (PPRP) for the SU (316), and continues cycling.

It will be apparent to one skilled in the art that a SU may transmit a PMC in place of a PMA in the above-described method.

Figure 4:
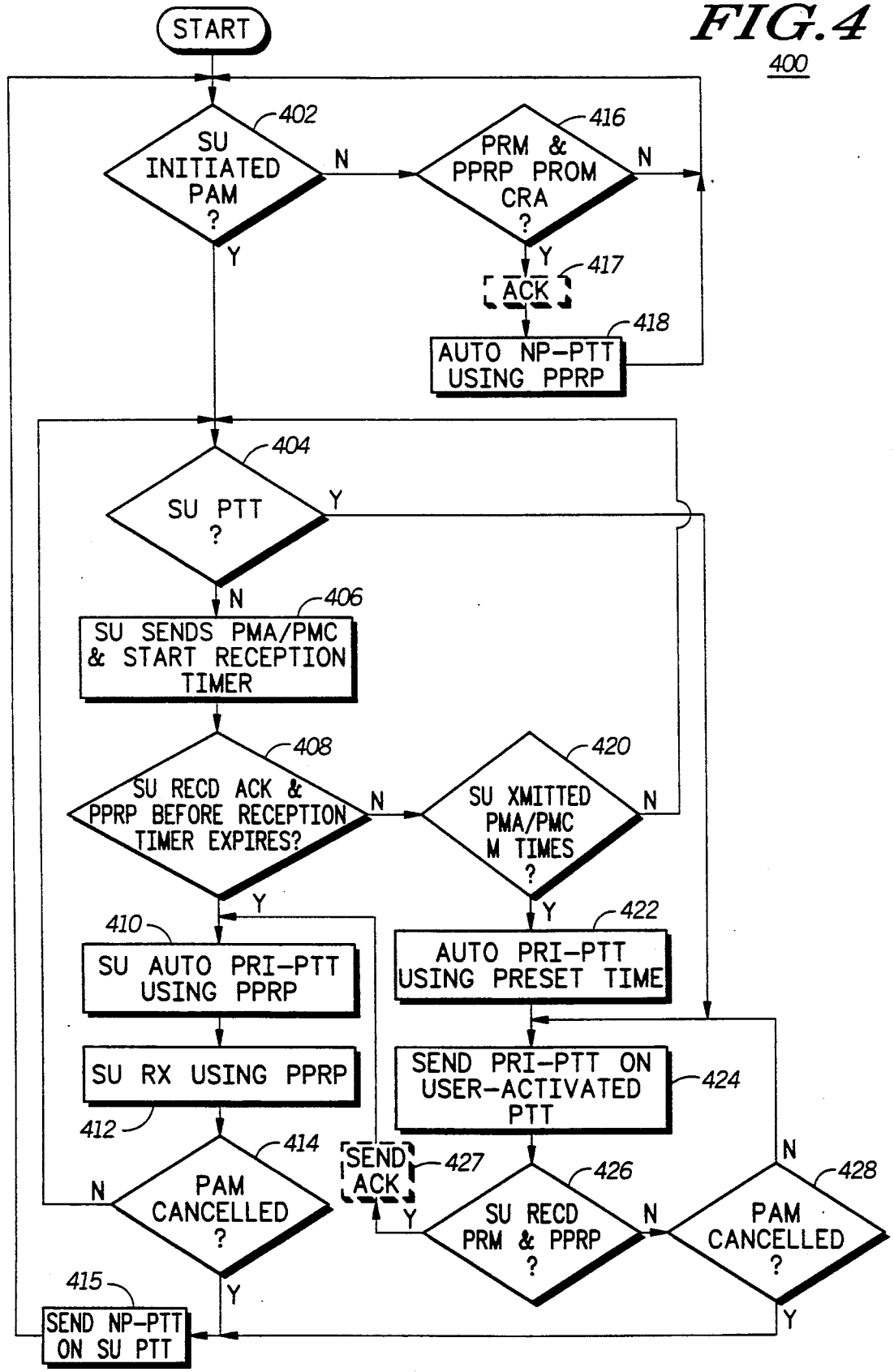
FIG. 4 is a flow diagram of an implementation of a method by a SU in accordance with the invention.

FIG. 4, generally depicted by the numeral 400, sets forth the method of the invention as utilized by a SU. As in the implementation of the invention by the CRA, it is perhaps best to first describe the flow loop for the SU, referred to herein as loop 3, in which no transmission errors occur. The SU determines whether it desires to initiate a PAM (402). The SU that desires to initiate a PAM (402) then determines whether to send a PTT (404). When the SU does not send a PTT (404), the SU sends a PMA/PMC and starts a reception timer (406). Upon receiving an ACK and PPRP (408), the SU tranmits a PRI-PTT using the authorized PPRP (410), and receives using the authorized PPRP (412). When the SU does not desire to cancel its PAM (414), the SU recycles to determining whether to send a PTT (404). Loop 3 is closed. When the SU desires to cancel its PAM (414), the SU sends a NP-PTT on future SU PTT's (415) and recycles to determining whether it desires to initiate a PAM (402).

In the loop 3 pathway, upon the SU not desiring to cancel its PAM (414), the SU recycles to determining whether to send a PTT (404).

In the loop 3 pathway, upon the SU determining that it does not desire to initiate a PAM (402), the SU determines whether it has received a PRM and a PPRP from a CRA (416). When the SU has not received a PRM and a PPRP from a CRA (416), the SU recycles to determining whether it desires to initiate a PAM (402). When the SU has received a PPRP from a CRA (416), the SU sends an acknowledgement (ACK), if desired, (417) to the CRA, and sends an automatic NP-PTT for the time authorized in the PPRP (418), followed by recycling to to determining whether it desires to initiate a PAM (402).

In the loop 3 pathway, upon the SU determining that an ACK and a PPRP have not been received (408), typically by the reception time expiring, the SU determines whether a PMA/PMC has been transmitted a predetermined number of times, M (420). A typical predetermined number of times, M, is twenty. When the SU has not transmitted a PMA for M times (420), the SU recycles to determining whether to send a PTT (404). When the SU has transmitted a PMA M times (420), the SU transmits automatic PRI-PTT using a preset time period (422) and continues to utilize the SU PTT to transmit PRI-PTT for a desired number of transmissions (424). A typical preset time period is 10 to 20 seconds. When the SU has received a PRM and PPRP (426), the SU acknowledges, if desired, (427) and recycles to automatically transmitting a PRI-PTT in loop 3 using the authorized PPRP (410), and continues cycling as set forth above for loop 3. When the SU has not received a PRM and PPRP (426), the SU determines whether the SU PAM has been cancelled (428). PAM cancelling takes place essentially by a SU resetting command or by a CRA resetting command. When the SU PAM has not been cancelled (428), the SU recycles to utilizing the SU PTT to transmit PRI-PTT for a desired number of transmissions (424) and continuing cycling as described above. When the SU PAM has been cancelled (428), the SU sends a NP-PTT on future SU PTTs (415) and recycles to determining whether it desires to initiate a PAM (402).

In loop 3, when the SU sends a PTT (404), the SU cycles to transmitting a PRI-PTT on a SU PTT (424) and continues cycling thereafter as set forth above.

Figure 5:
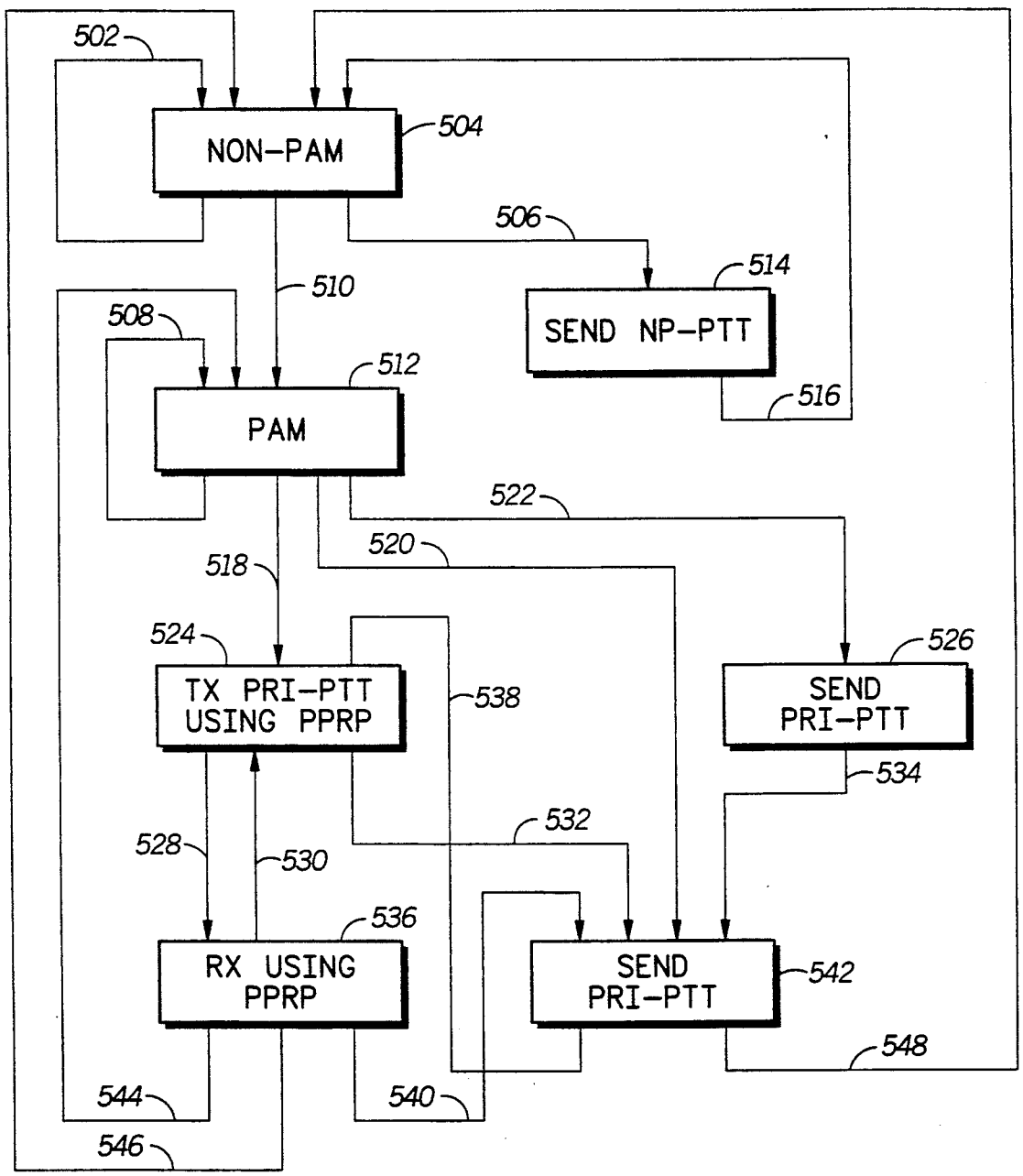
FIG. 5 is a SU state transition diagram in accordance with the invention.

FIG. 5, depicted by the numeral 500, sets forth a SU state transition diagram in accordance with the invention. State transition diagrams typically represent at least one state, set forth in figures in box form, an event causing an action and at least one action caused (EVENT/ACTION), the event and at least one action set forth in figures by arrows, and at least a next state, set forth in figures in box form.

A normal transmission state, defined as any state not a priority transmission state (NON-PAM), of an SU is set forth (504) in FIG. 5. Upon an SU in a NON-PAM state (504) desiring to send and sending a NP-PTT (502), the SU recycles and enters a NON-PAM state (504). Upon the SU in a NON-PAM state receiving a PRM and PPRP from a CRA and determining to send a NP-PTT (506), the SU then enters a state of sending a NP-PTT (514). Upon the SU completing sending a NP-PTT and determining to return to a NON-PAM state (516), the SU recycles and enters a NON-PAM state (504).

Upon the SU in a NON-PAM state determining to enter a PAM state and sending a priority access request, PMA/PMC (510), the SU enters a PAM state (512). The SU then follows one of the following state transition EVENT/ACTION branches:

upon the SU having sent a PMA/PMC less than n times, a suitable number for n being twenty, not receiving a PPRP, and sending another PMA/PMC (508), the SU recycles and enters a PAM state (512);

upon the SU having received a PPRP and determining to send an automatic PRI-PTT (518), the SU enters a state of transmitting a PRI-PTT using the PPRP (524);

upon the SU having user-activated a PTT and determining to send a PRI-PTT (520), the SU enters a state of user-activated sending PRI-PTT (542); and upon the SU having send a PMA/PMC at least n times, not having received a PPRP, and determining to send an automatic PRI-PTT (522), the SU enters a state of automatically sending a PRI-PTT (526).

Upon the SU having entered a state of automatically sending a PRI-PTT (526), the automatic PRI-PTT having been sent (534), the SU cycles to a state of user-activated sending PRI-PTT (542).

Upon the SU being in a state of transmitting a PRI-PTT using the PPRP (524), the SU then follows one of the following state transition EVENT/ACTION branches:

upon the SU completing the transmission of a PRI-PTT using the PPRP and determining to receive using the PPRP (528), the SU enters a state of receiving using the PPRP (536); and upon the SU completing the transmission of a PRI-PTT using the PPRP and determining to utilize a user-activated PRI-PTT (532), the SU enters a state of sending a user-activated PRI-PTT (542).

Upon the SU being in a state of receiving a PRI-PTT using the PPRP (536), the SU then follows one of the following state transition EVENT/ACTION branches:

upon the SU completing the reception of a PRI-PTT using the PPRP and determining to send a PMA (544), the SU recycles and enters a PAM state (512);

upon the SU receiving a PRS and determining to enter a NON-PAM state (546), the SU recycles and enters a NON-PAM state (504); and upon the SU transmitting and determining to utilize a user-activated PRI-PTT (540), the SU enters a state of sending a user-activated PRI-PTT (542).

Upon the SU being in a state of sending a user-activated PRI-PTT (542), the SU then follows one of the following state transition EVENT/ACTION branches:

upon the SU receiving a PRM and determining to send an automatic PRI-PTT (538), the SU enters a state of transmitting a PRI-PTT using the PPRP (524); and upon the SU receiving a PRS and determining to enter a NON-PAM state (548), the SU recycles and enters a NON-PAM state (504).

Figure 6:
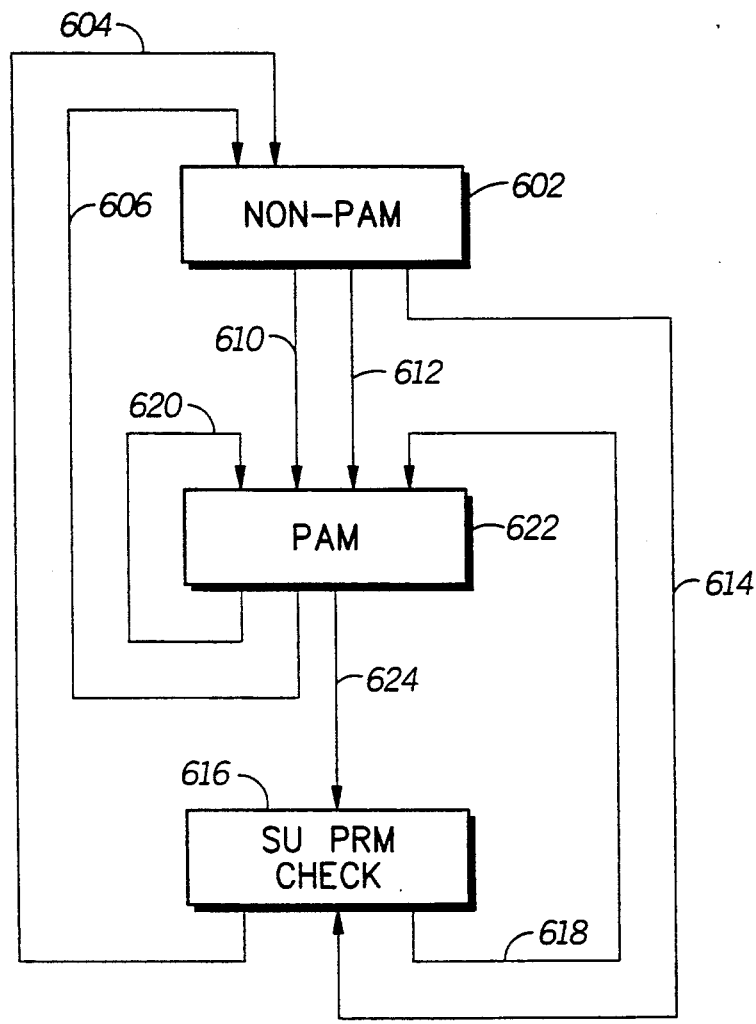
FIG. 6 is a CRA state transition diagram in accordance with the invention.

FIG. 6, depicted by the numeral 600, sets forth a CRA state transition diagram. Upon a CRA designating at least one SU in a NON-PAM state (602), and one EVENT/ACTION of:

receiving a PAM/PMC from an SU in a PAM state and sending an acknowledgement (ACK) and a PPRP to the SU (610); and receiving a PRI-PTT transmission from the SU and desiring to designate the SU in a PAM (612);

the CRA designates the SU in PAM state (622).

Upon a CRA designating at least one SU in a NON-PAM state (602), the CRA desiring to check the SU using a PRM and the CRA sending a PRM and PPRP to the SU (614), the CRA enters a state of checking the SU by sending the SU a PRM and PPRP (616).

Upon the CRA being in a state of designating at least one SU in a PAM state (622), the CRA then follows one of the following state transition EVENT/ACTION branches:

upon receiving a PAM/PMC from the SU and sending an acknowledgement (ACK) and a PPRP to the SU (620), the CRA recycles and enters the state of designating the SU in a PAM state (622);

upon desiring to end the SU PAM state and sending a PRS to the SU (606), the CRA recycles and enters the state of designating the SU in a NON-PAM state (602); and upon not receiving a PRI-PTT from the SU, desiring to check the SU utilizing a PRM and PPRP, sending a PRM and a PPRP to the SU (624), the CRA enters a state of checking the SU by sending the SU a PRM and PPRP (616).

Upon the CRA being in a state of checking the SU by sending the SU a PRM and PPRP (616), the CRA then follows one of the following state transition EVENT/ACTION branches:

upon receiving a NP-PTT from the SU and cancelling the PRM to the SU (604), the CRA recycles and enters the state of designating the SU in a NON-PAM state (602);

upon receiving a PRI-PTT from the SU and desiring the SU to remain in a PAM (618), the CRA recycles and enters the state of designating the SU in a PAM state (622).

We claim:

1. In a communication system having a limited number of communication resources, a plurality of subscriber units, and communication resource allocator means for allocating the limited number of communication resources among the plurality of subscriber units, a method for automatically processing priority messages, comprising the steps of:
   A) transmitting a priority message communication/access signal by a subscriber unit of the plurality of subscriber units;
   B) allocating a predetermined pair of related priority operational periods to the subscriber unit of step (A) when the priority message communication/access signal is received by the communication resource allocator means;
   C) automatically transmitting an priority push-to-talk signal by the subscriber unit of step (A); and
   D) utilizing the predetermined pair of related priority operational periods by the subscriber unit of step (A), and
further comprising:
   (a) automatically transmitting a priority message communication/access signal by the subscriber unit of step (A);
   (b) the subscriber unit of step (A)'s receiving an acknowledgement and a message allocating a predetermined pair of related priority operational periods to the subscriber unit of step (A) from the communication resource allocator means;
   (c) the subscriber unit's repeating steps (C) and (D); and repeating steps (a)–(c) for a predetermined number of times when the communication resource allocator means is not receiving the priority message communication/access signal.

2. In a communication system having a limited number of communication resources, a plurality of subscriber units, and communication resource allocator means for allocating the limited number of communication resources among the plurality of subscriber units, a method for automatically processing priority messages, comprising the steps of:
   A) transmitting a priority message communication/access signal by a subscriber unit of the plurality of subscriber units;
   B) allocating a predetermined pair of related priority operational periods to the subscriber unit of step (A) when the priority message communication/access signal is received by the communication resource allocator means;
   C) automatically transmitting a priority push-to-talk signal by the subscriber unit of step (A); and
   D) utilizing the predetermined pair of related priority operational periods by the subscriber unit of step (A), further comprising:
   (a) automatically transmitting a priority message communication/access signal by the subscriber unit of step (A);
   (b) the subscriber unit of step (A)'s receiving an acknowledgement and a message allocating a predetermined pair of related priority operational periods to the subscriber unit of step (A)

from the communication resource allocator means;

(c) the subscriber unit's repeating steps (C) and (D); and repeating steps (a)–(c) for a predetermined number of times when the communication resource allocator means is not receiving the priority message communication/access signal, and further comprising:

(E) the communication resource allocator means's acknowledging the priority message communication/access signal; and (F) the communication resource allocator means's transmitting a message allocating the predetermined pair of related priority operational periods to the subscriber unit of step (A); when the communication resource allocator means is receiving the priority message communication/access signal.

3. In a communication system having a limited number of communication resources, a plurality of subscriber units, and communication resource allocator means for allocating the limited number of communication resources among the plurality of subscriber units, a method for automatically processing priority messages, comprising the steps of:

A) transmitting a priority message communication/access signal by a subscriber unit of the plurality of subscriber units;

B) allocating a predetermined pair of related priority operational periods to the subscriber unit of step (A) when the priority message communication/access signal is received by the communication resource allocator means;

C) automatically transmitting a priority push-to-talk signal by the subscriber unit of step (A); and D) utilizing the predetermined pair of related priority operational periods by the subscriber unit of step (A), further comprising:

(a) automatically transmitting a priority message communication/access signal by the subscriber unit of step (A);

(b) the subscriber unit of step (A)'s receiving an acknowledgement and a message allocating a predetermined pair of related priority operational periods to the subscriber unit of step (A) from the communication resource allocator means;

(c) the subscriber unit's repeating steps (C) and (D); and repeating steps (a)–(c) for a predetermined number of times when the communication resource allocator means is not receiving the priority message communication/access signal, and further comprising repeating step (A) for a predetermined number of times when the subscriber unit of step (A) is not receiving the message allocating the predetermined pair of related priority operational periods to the subscriber unit of step (A).

4. The method of claim 3, further comprising:

(a) automatically transmitting a priority message access signal (automatically using a priority push-to-talk) by the subscriber unit of step 1(A) at least once; and (b) manually transmitting the priority message communication signal (sending a priority push-to-talk on a user-activated push-to-talk) by the subscriber unit of step (A) of claim 4 for a desired number of transmissions upon one of:

(1) receiving the priority message access signal by the communication resource allocator means; and (2) cancelling automatic transmission cycling by the subscriber unit of step (A) of claim 4;

followed by repeating step (b) at least a predetermined number of times upon the communication resource allocator means not receiving the priority message access signal.

5. In a communication system having a limited number of communication resources, a plurality of subscriber units, and communication resource allocator means for allocating the limited number of communication resources among the plurality of subscriber units, a method for automatically processing priority messages, comprising the steps of:

A) transmitting a priority message communication/access signal by a subscriber unit of the plurality of subscriber units;

B) allocating a predetermined pair of related priority operational periods to the subscriber unit of step (A) when the priority message communication/access signal is received by the communication resource allocator means;

C) automatically transmitting a priority push-to-talk signal by the subscriber unit of step (A); and D) utilizing the predetermined pair of related priority operational periods by the subscriber unit of step (A), further comprising:

(a) automatically transmitting a priority message communication/access signal by the subscriber unit of step (A);

(b) the subscriber unit of step (A)'s receiving an acknowledgement and a message allocating a predetermined pair of related priority operational periods to the subscriber unit of step (A) from the communication resource allocator means;

(c) the subscriber unit's repeating steps (C) and (D); and repeating steps (a)–(c) for a predetermined number of times when the communication resource allocator means is not receiving the priority message communication/access signal, and further comprising transmitting a priority remote monitor signal for a predetermined number of times to the subscriber unit of step (A) by the communication resource allocator means upon:

not receiving the priority message communication signal by the communication resource allocator means from the subscriber unit of step (A); and desiring to initiate a priority mode for the subscriber unit of step (A) by the communication resource allocator means.

6. The method of claim 5, further comprising:

(a) activating an alarm at the communication resource allocator means when the subscriber unit has not received the priority remote monitor signal and the priority remote monitor signal has been repeated at least a predetermined number of times; and (b) manually transmitting the priority message communication signal by the subscriber unit of step (A) of claim 6 for a desired number of transmissions when the subscriber unit has not received the priority remote monitor signal and the priority remote monitor signal has been repeated at least a predetermined number of times.

7. In a communication system having a limited number of communication resources, a plurality of subscriber units, and communication resource allocator means for allocating the limited number of communication resources among the plurality of subscriber units, a method for automatically processing priority messages, comprising the steps of:
  A) transmitting a priority message communication/access signal by a subscriber unit of the plurality of subscriber units;
  B) allocating a predetermined pair of related priority operational periods to the subscriber unit of step (A) when the priority message communication/access signal is received by the communication resource allocator means;
  C) automatically transmitting a priority push-to-talk signal by the subscriber unit of step (A); and
  D) utilizing the predetermined pair of related priority operational periods by the subscriber unit of step (A), further comprising:
    (a) automatically transmitting a priority message communication/access signal by the subscriber unit of step (A);
    (b) the subscriber unit of step (A)'s receiving an acknowledgement and a message allocating a predetermined pair of related priority operational periods to the subscriber unit of step (A) from the communication resource allocator means;
    (c) the subscriber unit's repeating steps (C) and (D); and repeating steps (a)–(c) for a predetermined number of times when the communication resource allocator means is not receiving the priority message communication/access signal, and
  further comprising recycling to step (A) upon one of:
    (a) manually transmitting of a priority message communication signal by the subscriber unit of step (A);
    (b) utilizing, by the subscriber unit of step (A), periods allocated by the message allocating the predetermined pair of related priority operational periods to the subscriber unit of step (A) by the communication resource allocator means; and
    (c) receiving a priority remote monitor command by the subscriber unit of step (A) from the communication resource allocation means.

8. In a communication system having a limited number of communication resources, a plurality of subscriber units, and communication resource allocator means for allocating the limited number of communication resources among the plurality of subscriber units, a method for automatically obtaining at least one pair of related priority operational periods by a subscriber unit, comprising:
  (A) transmitting a priority message communication/access signal by the subscriber unit;
  (B) receiving a message allocating a predetermined pair of related priority operational periods by the subscriber unit from the communication resource allocator means; and
  (C) automatically utilizing the message allocating the predetermined pair of related priority operational periods by the subscriber unit from the communication resource allocator means, further including the subscriber unit of step (A) determining whether to initiate a priority access mode, and
  further comprising recycling to determining whether the subscriber unit of step (A) desires to send a priority message communication signal when no priority access mode has been initiated and determining whether a request for a priority access state has been received from the communications resource allocator, further comprising one of:
    when no request for a priority access state has been received, recycling to determining whether to initiate a priority access mode; and
    when a request for a priority access state has been received, acknowledging if desired, automatically sending a non-priority push-to-talk using the predetermined pair of related priority operational periods, and recycling to determining whether to initiate a priority access mode.

9. In a communication system having a limited number of communication resources, a plurality of subscriber units, and communication resource allocator means for allocating the limited number of communication resources among the plurality of subscriber units, a method for automatically obtaining at least one pair of related priority operational periods by a subscriber unit, comprising:
  (A) transmitting a priority message access signal by the subscriber unit;
  (B) receiving a message allocating a predetermined pair of related priority operational periods by the subscriber unit from the communication resource allocator means; and
  (C) automatically utilizing the message allocating the predetermined pair of related priority operational periods by the subscriber unit from the communication resource allocator means, including the subscriber unit of step (A) determining whether to initiate a priority access mode and including recycling to determining whether the subscriber unit of step (A) desires to send a priority message communication signal when no priority access mode has been initiated and determining whether a request for a priority access state has been received from the communications resource allocator, further comprising one of;
    when no request for a priority access state has been received, recycling to determining whether to initiate a priority access mode; and
    when a request for a priority access state has been received, acknowledging if desired, automatically sending a non-priority push-to-talk using the predetermined pair of related priority operational periods, and recycling to determining whether to initiate a priority access mode,
  wherein when no priority access mode has been initiated, the subscriber unit of step (A) determines whether to utilize a push-to-talk.

10. The method of claim 9, when no priority access mode has been initiated by the subscriber unit of step (A), further comprising the subscriber unit of step (A) transmitting a signal to obtain a priority transmission period, the subscriber unit starting a reception timer, and the subscriber unit determining whether that subscriber unit has at least received a predetermined pair of related priority operational periods before a predetermined reception time expires.

11. The method of claim 10, when the subscriber unit has not at least received a predetermined pair of related priority operational periods before a predetermined reception time expires, further comprising the subscriber unit determining whether the signal to obtain a priority transmission period has been transmitted a predetermined number of times.

12. The method of claim 11, when the subscriber unit determines that the signal to obtain a priority transmission period has not been transmitted a predetermined number of times, further comprising recycling to the subscriber unit determining whether to send a push-to-talk.

13. The method of claim 11, when the subscriber unit determines that the signal to obtain a priority transmission period has been transmitted a predetermined number of times, further comprising the subscriber unit using an automatic priority push-to-talk utilizing a predetermined time, sending a priority push-to-talk on a user-activated push-to-talk, and determining whether the subscriber unit has received a priority remote monitor and predetermined pair of related priority operational periods.

14. The method of claim 13, when the subscriber unit determines that a priority remote monitor and predetermined pair of related priority operational periods have not been received, further comprising the subscriber unit determining whether a priority access mode has been cancelled and one of:
  upon determining that a priority access mode has been cancelled, sending a non-priority push-to-talk on a subscriber unit push-to-talk and recycling to determining whether to initiate a priority access mode; and
  upon determining that a priority access mode has not been cancelled recycling to sending a priority push-to-talk on a user-activated push-to-talk.

15. The method of claim 13, when the subscriber unit determines that a priority remote monitor and predetermined pair of related priority operational periods have been received, further comprising the subscriber unit acknowledging if desired, transmitting an automatic priority push-to-talk utilizing the predetermined pair of related priority operational periods, the subscriber unit utilizing the predetermined pair of related priority operational periods to receive, the subscriber unit determining whether the priority access mode has been cancelled, further comprising one of:
  upon determining that the priority mode has been cancelled, sending a non-priority push-to-talk on a subscriber push-to-talk and recycling to determining whether to initiate a priority access mode; and
  upon determining that the priority mode has not been cancelled, recycling to the subscriber unit sending a push-to-talk.

16. The method of claim 10, when the subscriber unit has at least received a predetermined pair of related priority operational periods before a predetermined reception time expires, further comprising the subscriber unit transmitting an automatic priority push-to-talk utilizing the predetermined pair of related priority operational periods, the subscriber unit utilizing the predetermined pair of related priority operational periods to receive, the subscriber unit determining whether the priority access mode has been cancelled, further comprising one of:
  upon determining that the priority mode has been cancelled, sending a non-priority push-to-talk on a subscriber push-to-talk and recycling to determining whether to initiate a priority access mode; and
  upon determining that the priority mode has not been cancelled, recycling to the subscriber unit sending a push-to-talk.

17. In a communication system having a limited number of communication resources, a plurality of subscriber units, and communication resource allocator means for allocating the limited number of communication resources among the plurality of subscriber units, a method for automatically obtaining at least one pair of related priority operational periods by a subscriber unit, comprising:
  (A) transmitting a priority message communication/access signal by the subscriber unit;
  (B) receiving a message allocating a predetermined pair of related priority operational periods by the subscriber unit from the communication resource allocator means; and
  (C) automatically utilizing the message allocating the predetermined pair of related priority operational periods by the subscriber unit from the communication resource allocator means, further including the subscriber unit of step (A) determining whether to initiate a priority access mode, and
further comprising recycling to determining whether the subscriber unit of step (A) desires to send a priority message communication signal when no priority access mode has been initiated and determining whether a request for a priority access state has been received from the communications resource allocator, further comprising one of:
  when no request for a priority access state has been received, recycling to determining whether to initiate a priority access mode; and
  when a request for a priority access state has been received, acknowledging if desired, automatically sending a non-priority push-to-talk using the predetermined pair of related priority operational periods, and recycling to determining whether to initiate a priority access mode, wherein the predetermined pair of related priority operational periods are a predetermined pair of related priority transmission and reception periods.

18. In a communication system having a limited number of communication resources, a plurality of subscriber units, and communication resource allocator means for allocating the limited number of communication resources among the plurality of subscriber units, a method for automatically processing priority messages by a communication resource allocator, comprising the steps of:
  A) receiving a priority access request from a subscriber unit of the plurality of subscriber units;
  B) placing the communication resource allocator console in a priority state and allocating a predetermined pair of related priority operational periods to the subscriber unit of step (A); and
  C) transmitting the predetermined pair of related priority operational periods to the subscriber unit of step (A), including the communication resource allocator determining whether the subscriber unit of step(A) is transmitting a signal requesting a priority operational period such that when the communication resource allocator determines that the subscriber unit of step(A) is not transmitting a signal requesting a priority operational period, further comprising the communication resource allocator determining whether the subscriber unit is utilizing a first priority push-to-talk.

19. The method of claim 18, when the communication resource allocator determines that the the subscriber unit is not utilizing a first priority push-to-talk, further comprising the communication resource allocator determining whether the communication resource allocator desires to check the subscriber unit utilizing a priority remote monitor signal, and one of:

upon the communication resource allocator not desiring to check the subscriber unit utilizing a priority remote monitor signal, the communication resource allocator recycling to determining whether the subscriber unit of step (A) of claim 24 is transmitting a signal requesting a priority operational period; and upon the communication resource allocator desiring to check the subscriber unit utilizing a priority remote monitor signal, determining a predetermined pair of related priority operational periods, sending a priority remote monitor signal and the predetermined pair of related priority operational periods, and determining whether the subscriber unit is utilizing a priority push-to-talk.

20. The method of claim 19, upon the communication resource allocator determining that the subscriber unit is utilizing a priority push-to-talk, further comprising the communication resource allocator allocating a priority access mode to the subscriber unit, and recycling to determining whether the subscriber unit of step (A) of claim 24 is transmitting a signal requesting a priority operational period.

21. The method of claim 19, upon the communication resource allocator determining that the subscriber unit is not utilizing a priority push-to-talk, further comprising the communication resource allocator determining whether the subscriber unit is utilizing a non-priority push-to-talk.

22. The method of claim 21, upon the communication resource allocator determining that the subscriber unit is not utilizing a non-priority push-to-talk, the communication resource allocator determining whether a priority remote monitor signal has been transmitted a predetermined number of times, and one of:

upon the priority remote monitor signal having been transmitted a predetermined number of times, sounding a failure alert and recycling to determining whether the subscriber unit of step (A) of claim 24 is transmitting a signal requesting a priority operational period; and upon the priority remote monitor signal having not been transmitted a predetermined number of times, the communication resource allocator recycling to determining a predetermined pair of related priority operational periods, sending a priority remote monitor signal and the predetermined pair of related priority operational periods, and determining whether the subscriber unit is utilizing a priority push-to-talk.

23. In a communication system having a limited number of communication resources, a plurality of subscriber units, and communication resource allocator means for allocating the limited number of communication resources among the plurality of subscriber units, a method for automatically processing priority messages by a communication resource allocator, comprising the steps of:

A) receiving a priority access request from a subscriber unit of the plurality of subscriber units;

B) placing the communication resource allocator console in a priority state and allocating a predetermined pair of related priority operational periods to the subscriber unit of step (A); and C) transmitting the predetermined pair of related priority operational periods to the subscriber unit of step (A), including the communication resource allocator determining whether the subscriber unit of step(A) is transmitting a signal requesting a priority operational period such that when the communication resource allocator determines that the subscriber unit of step (A) is not transmitting a signal requesting a priority operational period, further comprising the communication resource allocator determining whether the subscriber unit is utilizing a first priority push-to-talk when the communication resource allocator determines that the subscriber unit of step (A) is utilizing a priority push-to-talk, further comprising the communication resource allocator determining whether the communication resource allocator has allocated a priority access mode to the subscriber unit and one of:

upon the communication resource allocator determining that a priority access mode has been allocated to the subscriber unit, the communication resource allocator recycling to determining whether the subscriber unit of step (A) is transmitting a signal requesting a priority operational period; and upon the communication resource allocator determining that a priority access mode has not been allocated to the subscriber unit, placing the communication resource allocator in a priority access mode for that subscriber unit, the communication resource allocator determining a predetermined pair of related priority operational periods, sending a priority remote monitor signal and the predetermined pair of related priority operational periods, and determining whether the subscriber unit is utilizing a priority push-to-talk.

24. In a communication system having a limited number of communication resources, a plurality of subscriber units, and communication resource allocator means for allocating the limited number of communication resources among the plurality of subscriber units, a method for automatically processing priority messages by a communication resource allocator, comprising the steps of:

A) receiving a priority access request from a subscriber unit of the plurality of subscriber units;

B) placing the communication resource allocator console in a priority state and allocating a predetermined pair of related priority operational periods to the subscriber unit of step (A); and C) transmitting the predetermined pair of related priority operational periods to the subscriber unit of step (A), the communication resource allocator determining whether the subscriber unit of step(A) is transmitting a signal requesting a priority operational period such that when the communication resource allocator determines that the subscriber unit of step (A) is transmitting a signal requesting a priority operational period, further comprising placing the communication resource allocator in a priority access mode for that subscriber unit, transmitting an acknowledgement if desired and transmitting a predetermined pair of related priority operational periods, and determining whether the subscriber unit is utilizing a priority push-to-talk and one of:

upon determining that the subscriber unit is utilizing a priority push-to-talk, recycling to determining whether the subscriber unit of step (A) is transmitting a signal requesting a priority operational period; and upon determining that the subscriber unit is not utilizing a priority push-to-talk, determining a predetermined pair of related priority operational periods, sending a priority remote monitor and the predetermined pair of related priority operational periods, and determining whether the subscriber unit is utilizing a priority push-to-talk.

25. In a communication system having a limited number of communication resources, a plurality of subscriber units, and communication resource allocator means for allocating the limited number of communication resources among the plurality of subscriber units, a method for automatically processing priority messages by a communication resource allocator, comprising the steps of:

A) receiving a priority access request from a subscriber unit of the plurality of subscriber units;

B) placing the communication resource allocator console in a priority state and allocating a predetermined pair of related priority operational periods to the subscriber unit of step (A); and C) transmitting the predetermined pair of related priority operational periods to the subscriber unit of step (A), the communication resource allocator determining whether the subscriber unit of step(A) is transmitting a signal requesting a priority operational period such that;

when the communication resource allocator determines that the subscriber unit of step(A) is not transmitting a signal requesting a priority operational period, further comprising the communication resource allocator determining whether the subscriber unit is utilizing a first priority push-to-talk, and when the communication resource allocator determines that the the subscriber unit is not utilizing a first priority push-to-talk, further comprising the communication resource allocator determining whether the communication resource allocator desires to check the subscriber unit utilizing a priority remote monitor, and one of;

upon the communication resource allocator not desiring to check the subscriber unit utilizing a priority remote monitor, the communication resource allocator recycling to determining whether the subscriber unit of step(A) is transmitting a signal requesting a priority operational period; and upon the communication resource allocator desiring to check the subscriber unit utilizing a priority remote monitor, determining a predetermined pair of related priority operational periods, sending a priority remote monitor and the predetermined pair of related priority operational periods, and determining whether the subscriber unit is utilizing a second priority push-to-talk, such that upon the communication resource allocator determining that the subscriber unit is not utilizing a second priority push-to-talk, further comprising the communication resource allocator determining whether the subscriber unit is utilizing a non-priority push-to-talk, and such that upon the communication resource allocator determining that the subscriber unit is utilizing a non-priority push-to-talk, further comprising the communication resource allocator determining whether to cancel the priority remote monitor and one of:

upon determining to cancel the priority remote monitor, the communication resource allocator cancelling that priority remote monitor and recycling to determining whether the subscriber unit of step(A) is transmitting a signal requesting a priority operational period; and upon determining not to cancel the priority remote monitor, recycling to determining whether the subscriber unit of step(A) is transmitting a signal requesting a priority operational period.

26. In a communication system having a limited number of communication resources, a plurality of subscriber units, and communication resource allocator means for allocating the limited number of communication resources among the plurality of subscriber units, a method for automatically processing priority messages by a communication resource allocator, comprising the steps of:

A) receiving a priority access request from a subscriber unit of the plurality of subscriber units;

B) placing the communication resource allocator console in a priority state and allocating a predetermined pair of related priority operational periods to the subscriber unit of step (A); and C) transmitting the predetermined pair of related priority operational periods to the subscriber unit of step (A); including the communication resource allocator determining whether the subscriber unit of step(A) is transmitting a signal requesting a priority operational period such that when the communication resource allocator determines that the subscriber unit of step(A) is not transmitting a signal requesting a priority operational period, further comprising the communication resource allocator determining whether the subscriber unit is utilizing a first priority push-to-talk, wherein the predetermined pair of related priority operational periods are a predetermined pair of related priority transmission and reception periods.

* * * * *

UNITED STATES PATENT AND TRADEMARK OFFICE
CERTIFICATE OF CORRECTION

PATENT NO. : 5,134,714

DATED : July 28, 1992

INVENTOR(S) : James D. Janzen, Jeffrey Lohrbach, Michael S. Densmoor, Gregory A. Dertz, & Scott M. Mottonen It is certified that error appears in the above-identified patent and that said Letters Patent is hereby corrected as shown below:

Title page, item [54] and column 1, lines 2 and 3,

"REMOTE CONTROL OF PRIORITY COMMUNICATIONS AUTOMATIC" should be --AUTOMATIC REMOTE CONTROL OF PRIORITY COMMUNICATIONS--.

Signed and Sealed this

Twelfth Day of October, 1993

Attest:

BRUCE LEHMAN

Attesting Officer

Commissioner of Patents and Trademarks